(12) United States Patent
Pollitt et al.

(10) Patent No.: US 11,041,552 B2
(45) Date of Patent: Jun. 22, 2021

(54) COMPOSITE BALL SCREW

(71) Applicant: Crompton Technology Group Limited, Solihull (GB)

(72) Inventors: William Pollitt, Kenilworth (GB); Konrad Wilder, Rock Hill, SC (US)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 90 days.

(21) Appl. No.: 16/034,437

(22) Filed: Jul. 13, 2018

(65) Prior Publication Data
US 2019/0017581 A1   Jan. 17, 2019

(30) Foreign Application Priority Data
Jul. 14, 2017   (EP) .................................... 17275109

(51) Int. Cl.
*F16H 25/22*   (2006.01)
*B29C 53/58*   (2006.01)
(Continued)

(52) U.S. Cl.
CPC ....... *F16H 25/2204* (2013.01); *B29C 53/586* (2013.01); *B32B 1/00* (2013.01);
(Continued)

(58) Field of Classification Search
CPC .... F16C 2220/28; F16C 3/026; B29C 53/586; B23B 2605/18; B23B 2260/046; F16H 2025/249; F16H 25/2204
See application file for complete search history.

(56) References Cited

U.S. PATENT DOCUMENTS 2,629,894 A * 2/1953 Boggs .................. B29C 53/585
264/137
3,886,029 A * 5/1975 Poulsen ................ B29C 53/581
242/444
(Continued)

FOREIGN PATENT DOCUMENTS

DE          3742255 C1 *   5/1989   ............. F16C 3/026
DE    102011120197 A1 *   6/2013   ............. F16H 25/24
(Continued)

OTHER PUBLICATIONS

Extended European Search Report for International Application No. 17275109.1 dated Jan. 8, 2018, 8 pages.
(Continued)

*Primary Examiner* — Jake Cook
*Assistant Examiner* — T. Scott Fix
(74) *Attorney, Agent, or Firm* — Cantor Colburn LLP

(57) ABSTRACT

A threaded shaft for a ball screw comprising: a shaft of fibre-reinforced polymer material; and a helical ridge formed on an outer surface of said shaft, said helical ridge being formed from a fibre-reinforced polymer material comprising a plurality of helical fibres wound around the shaft in the same sense and grouped together to form the ridge. The helical ridge formed from grouped helical fibres all wound with the same sense provides excellent axial load carrying capability as the fibres run continuously from end to end of the shaft and can thus transmit load from end to end. This adds much greater strength than a shaft formed from plastics only. The load carrying capability of the fibre wound helical ridge can indeed approach that of existing metal threads while still being much lighter in weight.

9 Claims, 3 Drawing Sheets

(51) Int. Cl.
*F16C 3/02* (2006.01)
*B32B 1/00* (2006.01)
*B32B 3/30* (2006.01)
*B32B 5/02* (2006.01)
*B32B 5/26* (2006.01)
*B32B 37/24* (2006.01)
*F16H 25/24* (2006.01)

(52) U.S. Cl.
CPC ............... *B32B 3/30* (2013.01); *B32B 5/02* (2013.01); *B32B 5/26* (2013.01); *B32B 37/24* (2013.01); *F16C 3/026* (2013.01); *F16H 25/24* (2013.01); *B32B 2305/10* (2013.01); *B32B 2307/54* (2013.01); *B32B 2605/18* (2013.01); *F16C 2220/28* (2013.01); *F16H 2025/249* (2013.01)

(56) References Cited

U.S. PATENT DOCUMENTS

| | | | | |
|---|---|---|---|---|
| 3,970,495 | A * | 7/1976 | Ashton | B29C 33/52 156/162 |
| 4,620,401 | A * | 11/1986 | L'Esperance | B29C 70/205 52/309.15 |
| 4,623,290 | A * | 11/1986 | Kikuzawa | B29C 70/22 411/350 |
| 4,715,262 | A | 12/1987 | Nelson et al. | |
| 4,774,043 | A | 9/1988 | Beckmann | |
| 4,777,869 | A | 10/1988 | Dirkin et al. | |
| 5,080,547 | A * | 1/1992 | Moghe | B29C 53/585 156/393 |
| 5,092,539 | A | 3/1992 | Caero | |
| 5,092,727 | A * | 3/1992 | Moghe | B29C 53/585 411/411 |
| 5,114,290 | A * | 5/1992 | Moghe | B29C 53/585 156/391 |
| 5,554,899 | A | 9/1996 | Teramachi | |
| 6,228,473 | B1 * | 5/2001 | Takemura | B29C 70/40 428/295.1 |
| 6,350,204 | B1 * | 2/2002 | Yasui | B29C 53/587 464/181 |
| 7,335,108 | B2 | 2/2008 | Lin et al. | |
| 8,613,580 | B2 * | 12/2013 | Hecht | F16B 33/006 411/424 |
| 8,974,165 | B2 * | 3/2015 | Yumi | F16B 33/006 411/424 |
| 9,028,635 | B2 * | 5/2015 | Jeong | B29C 70/083 156/184 |
| 10,533,596 | B2 * | 1/2020 | Ikada | F16B 33/02 |
| 2009/0100949 | A1 * | 4/2009 | Shirai | F16C 33/303 74/89.14 |
| 2014/0124976 | A1 * | 5/2014 | Tateyama | B29C 70/48 264/257 |
| 2015/0314498 | A1 * | 11/2015 | Iwasaki | F16H 25/24 411/427 |
| 2016/0153489 | A1 | 6/2016 | Pollitt et al. | |
| 2016/0272304 | A1 | 9/2016 | Goldring et al. | |

FOREIGN PATENT DOCUMENTS

| | | | |
|---|---|---|---|
| EP | 0449245 A2 * | 10/1991 | ........... B29C 70/085 |
| EP | 0449245 A2 | 10/1991 | |
| GB | 1293019 A | 10/1972 | |
| WO | 2016159303 A1 | 10/2016 | |

OTHER PUBLICATIONS

EPO Official Letter for Application No. 17275109.1 dated Aug. 27, 2020, 5 pages.

* cited by examiner

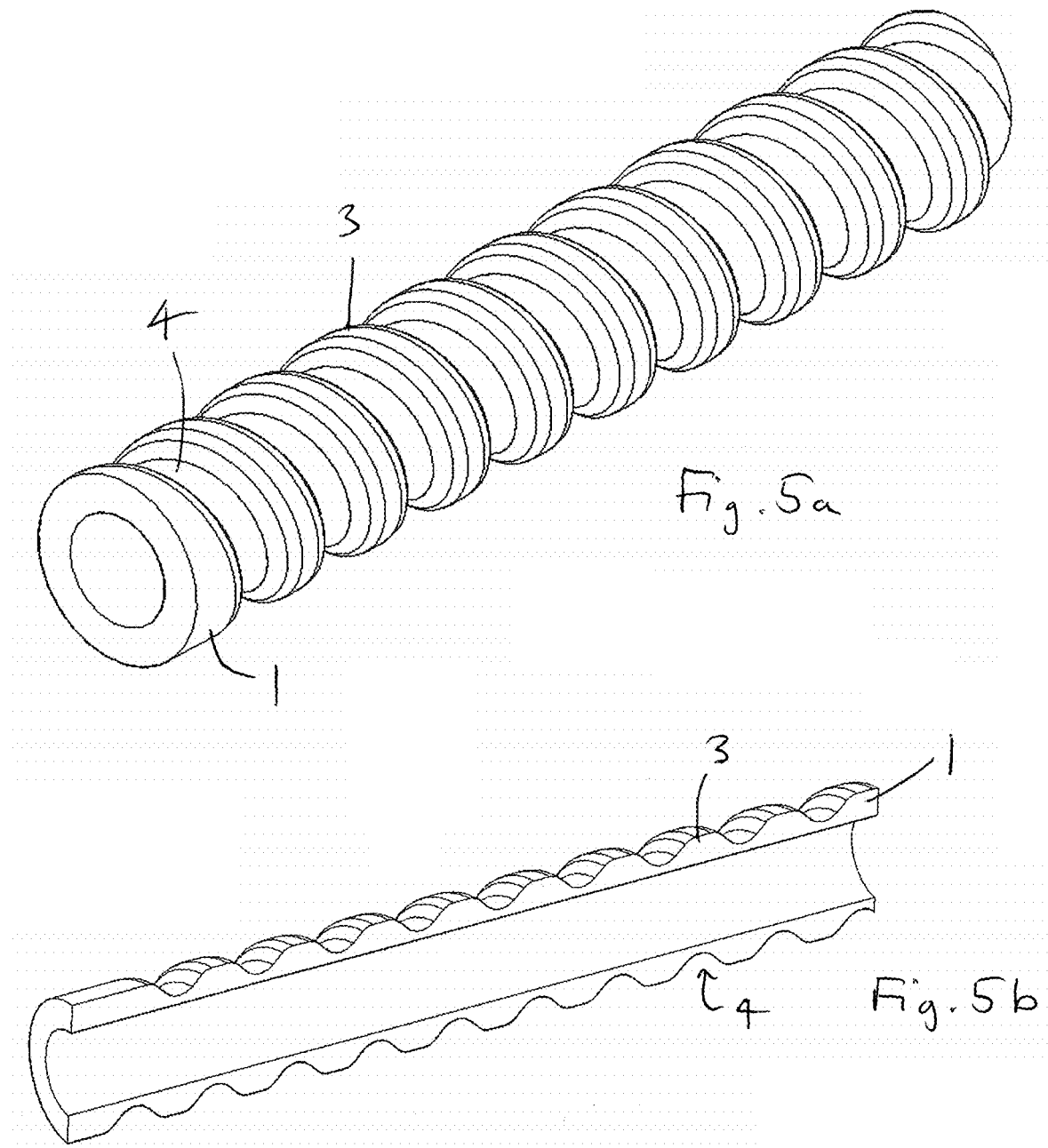

COMPOSITE BALL SCREW

FOREIGN PRIORITY

This application claims priority to European Patent Application No. 17275109.1 filed Jul. 14, 2017, the entire contents of which is incorporated herein by reference.

TECHNICAL FIELD

This disclosure relates to ball screws, in particular a composite threaded ball screw shaft. Particularly preferred arrangements may be used in aircraft applications such as aircraft actuators.

BACKGROUND

Ball screws are linear actuators that comprise an externally threaded shaft and an internally threaded nut. The grooves formed by these threads receive ball bearings that can roll within the grooves and transmit forces between the shaft and the nut. Ball screws are used to change rotational motion into linear motion. For example rotation of the nut while preventing rotation of the shaft will result in translational motion of the shaft. The ball bearings ensure low friction.

Ball screws are typically formed out of metals or plastics. Ball screws are typically used in high precision applications and are manufactured to very close tolerances and therefore metal is typically preferred, at least for forming the thread and grooves that form the ball race. Metal is also preferred for providing large axial load transfers. However metals are heavy and this can be a problem in long length applications. Plastics provide ball screws with a reduced weight, but they are limited on axial load transfer and thus cannot be used in high load applications.

SUMMARY

According to this disclosure, there is provided a threaded shaft for a ball screw comprising: a shaft of fibre-reinforced polymer material; and a helical ridge formed on an outer surface of said shaft, said helical ridge being formed from a fibre-reinforced polymer material comprising a plurality of helical fibres wound around the shaft in the same sense and grouped together to form the ridge.

The shaft of fibre-reinforced polymer material may be formed in any suitable way. In preferred examples it is a hollow shaft, e.g. as results from formation around a mandrel.

Composite shafts are typically formed from some form of fibre or polymer encased within a matrix such as resin. One example is Carbon Fibre Reinforced Polymer (CFRP). Another is Glass Fibre Reinforced Polymer (GFRP). Filament wound structures are typically formed by winding filaments such as carbon fibres around a mandrel in a helical fashion so as to build up a tube shaped shaft. The angle of the helical winding influences the properties of the shaft. For example, windings approaching 45 degrees have higher torsional properties and those higher than 45 degrees have greater properties in the hoop direction. About 45 degrees is generally optimal for torque transmission. Other techniques for manufacturing PMCs include braiding, fibre placement techniques (including AFP), prepreg wrap techniques and pultrusion methods. The method of forming the base composite layer of the threaded shaft is not particularly important. It will be appreciated that several layers of fibre reinforced polymer may be deposited prior to formation of the helical ridge, with different layers having different properties. For example, the fibre angle may be varied between layers to give different properties such as for bending resistance or impact resistance.

The helical ridge formed from grouped helical fibres all wound with the same sense provides excellent axial load carrying capability as the fibres run continuously from end to end of the shaft and can thus transmit load from end to end. This adds much greater strength than a shaft formed from plastics only. The load carrying capability of the fibre wound helical ridge can indeed approach that of existing metal threads while still being much lighter in weight. The fibre shaft will also exhibit better characteristics in terms of resistance to bending and buckling, particularly in long length applications.

It will be appreciated that as the helical ridge forms a raised spiral around the shaft it also forms a groove running parallel to the ridge, the groove being between adjacent raised parts of the ridge formed by successive turns of the helical ridge around the shaft.

Grouping the fibres together ensures that as a whole, the plurality of fibres form a helical ridge rather than spreading out evenly to form a flat layer around the shaft.

It will be appreciated that the helical ridge is formed only from fibres wound with one rotational sense. It is normal practice when winding layers of fibre reinforced polymer to wind fibres in opposite senses so as to from cross-overs. This is typically done by passing the fibre dispenser back and forth axially along the length of the mandrel while rotating the mandrel continuously in one direction. The helical ridge is formed without laying any fibres in the opposite rotational sense so that there are no cross-overs. This is what allows the building up of a ridge and groove structure.

It will be appreciated that the helical fibres of the ridge preferably run substantially parallel to one another around the shaft, i.e. each helical fibre of the ridge is laid with substantially the same helix angle as all the other ridge fibres. The fibres will of course be offset axially from one another and/or formed with a different helix diameter (as the winds get radially further out from the shaft axis), but the preferably all have substantially the same helix angle. It will be appreciated that some variation in helix angle will be acceptable within certain tolerance bounds.

Any type of fibre reinforcement may be used and a suitable type may be selected depending on the particular use and strength requirements. In particularly preferred examples the helical fibres are glass fibres or carbon fibres. Glass fibres are cheaper. Carbon fibres have greater axial load strength and lower density and are therefore preferred in most cases.

The helical ridge of fibre reinforced polymer may itself provide the outer surface of the threaded shaft if it is formed sufficiently smooth and even. However it is normal to expect some smoothing or machining to be required in order to provide a finished product. This will be particularly the case for ball screws as they are often precision devices which require fairly exact dimensions and a smooth groove to form a low friction ball race. As the helical fibres of the helical ridge provide the axial load strength it is desirable not to damage those fibres by any kind of machining or grinding as that would reduce the strength. Thus the threaded shaft preferably further comprises an outer layer of fibre reinforced polymer material formed over the shaft and the helical ridge. This outer layer provides a full coverage over the helical ridge (and any intervening parts of the shaft base layer that have not been covered by the ridge) and provides a protective layer over the top of the ridge fibres. This layer can be wound either as helical fibre (wound in back and forth and in both rotational senses as is normal for forming a full-coverage layer) with any suitable fibre angle, or it may be wound as hoop fibre (with angle close to 90 degrees to the shaft axis). The latter (or a high angle helical wind) may be preferred for avoiding fibre bridging issues that may arise from laying fibre across two adjacent turns of the ridge.

This protective layer is not critical to the strength of the part and therefore can be abraded in order to provide a desired surface finish. Therefore in some preferred examples the outer layer of fibre reinforced polymer has been shaped and/or smoothed by a material removal process. Suitable material removal processes may include machining, grinding and/or polishing. These processes may be used to finalise the desired profile of the ridge and groove. The material removal processes only remove material to a depth less than the thickness of the outer fibre layer so as not to risk cutting into the underlying helical threads of the helical ridge which provide the axial load strength.

Preferably the threaded shaft further comprises a top coat of hard material. This top coat may be applied on top of the helical ridge or on top of the outer fibre layer if present so that it forms the outermost layer of the shaft. The hard top coat provides wear resistance and impact resistance and provides a low friction surface which can act as a ball race for a ball screw. Preferred materials include hard chrome or ceramic. In some examples the top coat preferably has a hardness greater than 60 Rockwell C. However it will be appreciated that this is very application dependent and will for example depend on the materials used for the ball bearings and the ball nut as well as on the expected forces that will be generated in use. Any top coat applied to the threaded shaft will need to be sufficiently well bonded to the underlying composite to avoid any separation of the two materials. If required, one or more additional bonding layers may be interposed between the composite and the top coat.

As discussed above, a helical groove is formed interwound with the helical ridge. The helix angle of the ridge, i.e. the angle to the shaft axis, can be varied according to the design requirements, but will be determined to a large extent by the function of the particular application, e.g. the precision and adjustment speed requirements. The helix angle of the ridge also determines the helix angle of the groove. The width of the ridge (together with the helix angle) will determine the width of the groove and can be adjusted appropriately to from the desired groove profile. For example the helical groove may be shaped so as to receive ball bearings, thus forming a ball race as part of a ball screw. The groove may be semi-circular in cross-section (cross-section taken perpendicular to the fibres of the helical ridge).

The shape of the groove is determined by the shape of the sides of the ridge. This may be determined during the winding of the ridge fibres as they can be grouped together in a variety of different shapes. In some preferred examples the ridge fibres are grouped so as to form a substantially pyramidal or trapezoidal cross-section (again cross-section taken perpendicular to the ridge fibres) with sloped side surfaces forming the sides of the groove. The width of the ridge and the steepness of the slope of the sides of the ridge can also be selected so as to form the desired groove shape (or approximately the desired groove shape with the finishing touches being provided by machining, grinding or polishing as necessary).

In some preferred examples the helical ridge has a flat radially outer surface. The flat outer surface is particularly useful for ball screws with a ball nut that moves axially along the outer surface of the threaded shaft (supported by ball bearings running in the helical groove).

The above description is based on a single-start thread design in which a groove is formed between adjacent turns of the same helical ridge. However, the threaded shaft may equally well have a multi-start design with a plurality of helical ridges interleaved with one another. For example the threaded shaft may comprise two or more helical ridges running parallel to each other and interwound with each other. In such cases, a plurality of helical grooves will also be formed. Each groove will be formed between two different helical ridges, but the principles are otherwise identical.

According to a further aspect, this disclosure provides a method of forming a threaded shaft for a ball screw comprising: winding fibres onto an outer surface of a mandrel so as to form a base layer of fibre reinforced polymer material onto an outer surface of a mandrel; winding a plurality of helical fibres around the base layer in the same sense and in a group so as to form a helical ridge on the base layer.

All of the preferred features described above also apply equally to the method of manufacture.

The base layer may be wound by passing a fibre dispenser axially back and forth along the mandrel while rotating the mandrel continually in one rotational sense. This is the normal procedure for forming a fibre reinforced polymer tube on a mandrel. The angle of the fibre may be varied according to design preferences and thus the layer may be helical wound or hoop wound or a combination of the two (it may indeed comprises multiple layers of different fibre angles).

The helical ridge may be formed by passing a fibre dispenser axially back and forth along the mandrel, and wherein when the fibre dispenser is moving in a first axial direction, the mandrel is rotated in a first rotational sense and when the fibre dispenser is moving in a second axial direction opposite the first axial direction the mandrel is rotated in a second rotational sense opposite the first rotational sense. This technique requires switching the rotation direction of the mandrel every time the fibre dispenser changes direction, but it results in all of the fibres being wound into helices with the same sense, i.e. clockwise or anti-clockwise (when viewed from a common direction).

It will be appreciated that an alternative process could be to pass the fibre dispenser in one direction only, cut the fibre and return the fibre dispenser to the start position again. This would not require changing the direction of rotation of the mandrel, but is a more labour intensive and time consuming process.

As discussed above, the method may further comprise winding fibres around the helical ridge and base layer so as to form an outer layer of fibre-reinforced polymer material. The outer layer may be formed by passing a fibre dispenser axially back and forth along the mandrel while rotating the mandrel continually in one rotational sense.

The method may additional comprise forming a top coat, e.g. of hard material on top of the helical ridge or outer fibre layer. The method may also further comprise using a material removal process to remove material from the outer fibre layer, thus shaping and/or smoothing the surface of the shaft and the groove.

BRIEF DESCRIPTION OF DRAWINGS

One or more non-limiting examples will now be described, by way of example only, and with reference to the accompanying figures in which:

FIGS. 5a and 5b are further views of a ball screw shaft.

DETAILED DESCRIPTION

Figure 1:
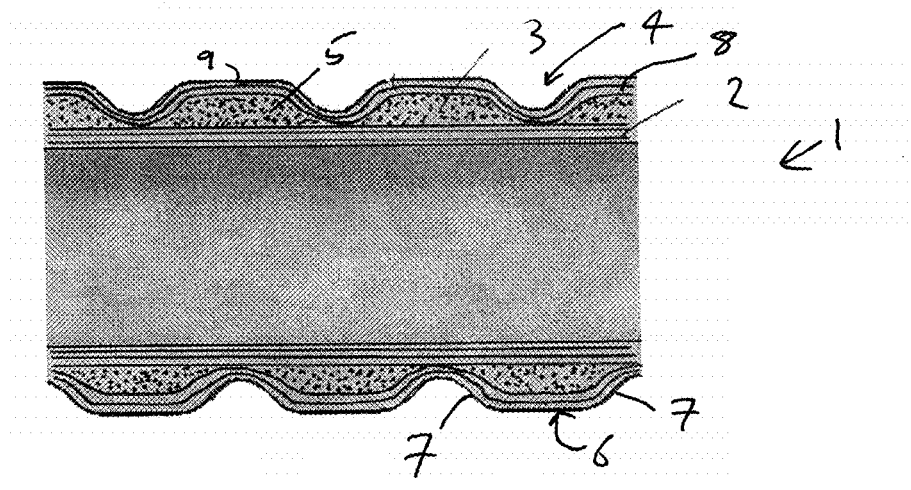
FIG. 1 shows a cross-section through a composite ball screw shaft.
Figure 2:
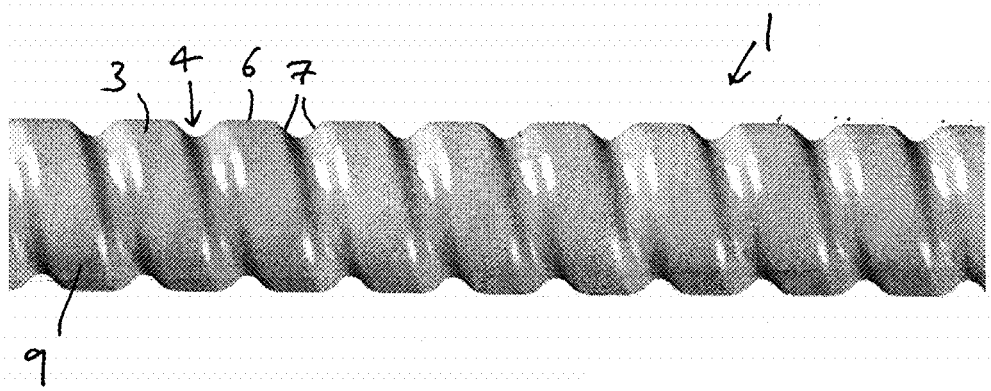
FIG. 2 shows a side view of the shaft of FIG. 1.

FIG. 1 shows a cross-section taken through a part of a hollow composite ball screw shaft 1. The hollow shaft 1 is made from carbon fibre reinforced polymer (CFRP) material. The shaft 1 has a base layer 2 forming its radially inner surface, the base layer 2 being formed from one or more layers of CFRP, either hoop wound or helically wound. The base layer 2 is a cylindrical tube of CFRP formed by passing a fibre dispenser back and forth along the length of a mandrel while rotating the mandrel continually in the same rotational direction. Thus the base layer 2 is formed from a plurality of helices of fibre wound on opposite senses such that they form cross-over points and together form a layer of full coverage.

On top of the base layer 2 a helical ridge 3 of fibre reinforced polymer is formed.

This helical ridge 3 is formed such that a continuous helical groove 4 is created between adjacent turns of the ridge 3. The helical ridge 3 shown in FIG. 1 is a single start thread, i.e. a single helix, but it will be appreciated that a multi-start thread can easily be formed by interleaving two or more such ridges 3. The groove 4 provides the running surface area for a ball bearing to ride in as part of a ball screw arrangement. The ball bearings transfer axial load between the screw and a ball nut placed around the screw shaft 1.

The helical ridge 3 is formed from a large number of fibres 5 each of which is wound in a helix around the base layer 2 in the same rotational sense. The fibres 5 are grouped together such that they build up a projection (having a certain radial height above the base layer 2) along some parts of the outer surface of the base layer, while leaving other parts of the base layer outer surface not built up (i.e. forming the groove 4). As shown in FIG. 1, the grouping forms a cross-sectional shape of the helical ridge 3 that is trapezoidal with a flat outer surface 6 facing radially outwardly and thus facing the ball nut in use, and two sloped side surfaces 7 that form the general shape of the groove 4.

The helical ridge 3 is formed by passing a fibre dispenser back and forth along the axis of the mandrel in the same way as for base layer 2, but instead of rotating the mandrel continually in the same direction, the mandrel's rotational direction is changed each time the fibre dispenser direction is changed. In this way a fibre 5 laid during forward movement of the dispenser may be laid parallel to a fibre 5 laid during reverse movement of the dispenser, i.e. the helices of these two fibres are substantially the same and as more such fibres 5 are laid by the same process and grouped together, the helical ridge 3 is built up, rather than a more uniform cylindrical layer such as is formed by the process of forming base layer 2.

On top of the helical ridge 3 (and also on top of any exposed parts of the base layer 2), a further layer 8 of fibre reinforced polymer material is formed. This upper layer 8 may be formed in the same way as base layer 2, namely by passing a fibre dispenser back and forth while rotating the mandrel continually in the same rotational direction. The upper layer 8 provides a surface that can be abraded so as to finish and shape the groove 4 to a precise shape e.g. to be suitable for use as a ball race of a ball screw. Machining or grinding of the upper layer 8 only severs the fibres in that layer and does not disrupt the strength-providing fibres 5 of the helical ridge 3 which are thus left intact so as to provide the maximum axial load capability.

After machining, grinding and/or polishing of the upper layer 8, a hard protective top coat 9 is added to provide a smooth, hard, low friction surface that is resistant to wear during use and provides smooth, accurate operation of the ball screw.

As the whole shaft 1 is formed from composite material, it is light weight (much lighter than a metal or partly metal shaft) while the helical fibres 5 that form the helical ridge 3 and thus the load carrying surface of the ball screw shaft 1 are much stronger than is achievable with simple plastics.

Additionally, the composite shaft provides better characteristics for shaft bending or buckling in long length applications (e.g. those above about 1.5 m).

Figure 3:
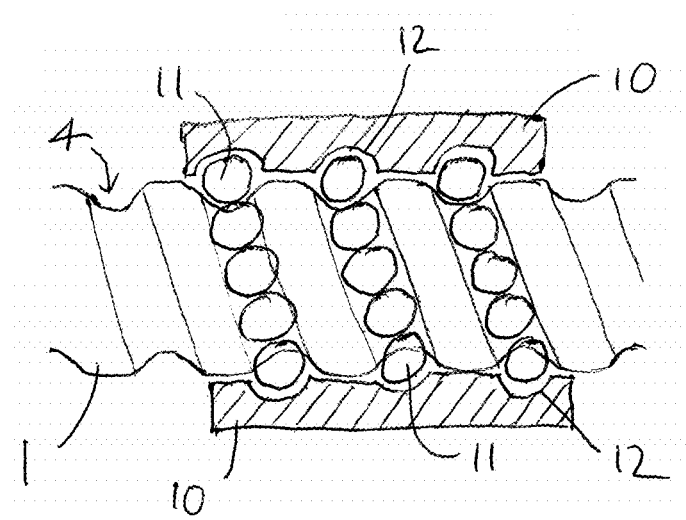
FIG. 3 shows a side view of part of a ball screw shaft and ball nut.

FIG. 3 shows a side view of part of a ball screw shaft 1 with a ball nut 10 (shown in cross-section for illustrative purposes) around the shaft 1. Ball bearings 11 run in the groove 4 as well as in a corresponding internal screw thread 12 on the ball nut 10, thereby transferring force between the shaft 1 and the ball nut 10. A ball return path formed within the ball nut 10 (not shown in FIG. 3) allows for cycling of the balls in known manner.

Figure 4:
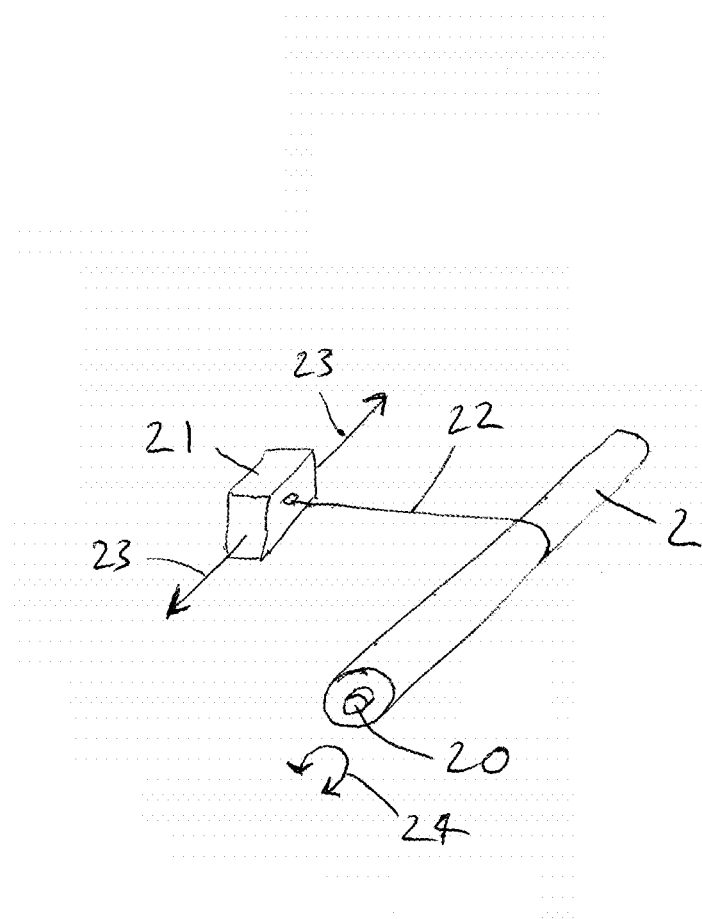
FIG. 4 illustrates a manufacturing apparatus.

FIG. 4 illustrates a manufacturing apparatus comprising a mandrel 20 around which the cylindrical base layer 2 is formed. The fibre dispenser 21 dispenses fibre 22 which is pulled around the mandrel 20 by rotation thereof. The fibre dispenser can move axially back and forth as illustrated by arrows 23. The mandrel 20 can be rotated in both rotational senses as illustrated by double-headed arrow 24.

Table 1 shows how the axial direction of the fibre dispenser is related to the rotational sense of the mandrel for each of the three main layers of the ball screw shaft 1. It will be appreciated that to make each layer the two corresponding rows of the Table 1 are repeated several times.

TABLE 1

| Layer | Fibre dispenser direction | Mandrel rotation sense |
|---|---|---|
| Base cylinder | → | ↻ |
|  | ← | ↻ |
| Helical ridge | → | ↻ |
|  | ← | ↺ |
| Upper Layer | → | ↻ |
|  | ← | ↻ |

By way of further illustration, FIG. 5a shows a perspective view of a composite ball screw shaft 1 and FIG. 5b shows a half-section of the ball screw shaft 1.

The ball screw described above will find particular application in aircraft equipment due to its high strength and light weight. However, it will be appreciated that it is equally applicable to other areas of technology. Additionally, while the screw has been described in relation to use in ball screws, it will be appreciated that the same technique may be used to create any other load carrying screw of composite material.

The invention claimed is:

1. A threaded shaft for a ball screw comprising:
    a shaft of fibre-reinforced polymer material;
    a helical ridge formed on an outer surface of said shaft, said helical ridge being formed from a fibre-reinforced polymer material comprising a plurality of helical fibres wound around the shaft in the same rotational sense and grouped together to form the ridge; and an outer layer of fibre reinforced polymer material formed over the shaft and the helical ridge wherein the outer layer provides a full coverage over the helical ridge.

2. A threaded shaft as claimed in claim 1, wherein the helical fibres run parallel to one another around the shaft.

3. A threaded shaft as claimed in claim 1, wherein the helical fibres are glass fibres or carbon fibres.

4. A threaded shaft as claimed in claim 1, wherein the outer layer of fibre reinforced polymer has been shaped and/or smoothed by a material removal process.

5. A threaded shaft as claimed in claim 1, further comprising a top coat of hard material, wherein the hard material has a hardness greater than 60 Rockwell C.

6. A threaded shaft as claimed in claim 1, wherein a helical groove is formed interwound with the helical ridge.

7. A threaded shaft as claimed in claim 6, wherein the helical groove is shaped so as to receive ball bearings.

8. A threaded shaft as claimed in claim 1, wherein the helical ridge has a flat radially outer surface.

9. A threaded shaft as claimed in claim 1, comprising two or more helical ridges running parallel to each other and interwound with each other.

\* \* \* \* \*